(12) United States Patent
Chew

(10) Patent No.: US 10,865,028 B2
(45) Date of Patent: Dec. 15, 2020

(54) HEAT SEALABLE, RETORTABLE LAMINATED FOIL

(75) Inventor: Kong Mun Chew, Singapore (SG)

(73) Assignee: MENTCON SINGAPORE PTE LTD., Singapore (SG)

(*) Notice: Subject to any disclaimer, the term of this patent is extended or adjusted under 35 U.S.C. 154(b) by 0 days.

(21) Appl. No.: 13/274,100

(22) Filed: Oct. 14, 2011

(65) Prior Publication Data
US 2012/0145569 A1 Jun. 14, 2012

Related U.S. Application Data

(63) Continuation-in-part of application No. 11/345,219, filed on Feb. 2, 2006, now Pat. No. 8,061,897.

(30) Foreign Application Priority Data

Feb. 14, 2005 (JP) .................. 2005-036281

(51) Int. Cl.
| | |
|---|---|
| *B65D 75/58* | (2006.01) |
| *B32B 27/32* | (2006.01) |
| *B32B 15/08* | (2006.01) |
| *B32B 27/34* | (2006.01) |
| *B32B 27/10* | (2006.01) |
| *B32B 27/36* | (2006.01) |

(Continued)

(52) U.S. Cl.
CPC .......... *B65D 75/5855* (2013.01); *B32B 15/08* (2013.01); *B32B 15/20* (2013.01); *B32B 27/08* (2013.01); *B32B 27/10* (2013.01); *B32B 27/32* (2013.01); *B32B 27/322* (2013.01); *B32B 27/34* (2013.01); *B32B 27/36* (2013.01); *B32B 27/40* (2013.01); *B32B 29/002* (2013.01); *B32B 2307/31* (2013.01); *B32B 2439/40* (2013.01); *B65D 85/38* (2013.01); *B65D 2575/586* (2013.01); *B65D 2585/545* (2013.01); *Y10T 428/264* (2015.01); *Y10T 428/265* (2015.01); *Y10T 428/2826* (2015.01)

(58) Field of Classification Search
CPC .... B65D 75/26; B65D 75/5855; B65D 85/38; B65D 2585/545
USPC ...................................... 206/5.1, 484, 484.2
See application file for complete search history.

(56) References Cited

U.S. PATENT DOCUMENTS

| | | | |
|---|---|---|---|
| 2,954,116 A | 9/1960 | Maso et al. | |
| 2,973,859 A | 3/1961 | Schladermundt | |

(Continued)

FOREIGN PATENT DOCUMENTS

| | | |
|---|---|---|
| DE | 74 35 910 U | 2/1975 |
| EP | 0129388 A2 | 12/1984 |

(Continued)

OTHER PUBLICATIONS

EP Search Report, EP App. No. 06001436, dated May 26, 2006 (5 pgs.).

(Continued)

*Primary Examiner* — Anthony D Stashick
*Assistant Examiner* — Blaine G Neway
(74) *Attorney, Agent, or Firm* — Dorsey & Whitney LLP

(57) ABSTRACT

A heat sealable, retortable laminated foil capable of being heat sealed to itself or to a polypropylene substrate in forming a contact lens package includes an outer polymeric barrier layer, an intermediate barrier layer, an inner polymeric barrier layer, and a heat sealable layer.

10 Claims, 11 Drawing Sheets

(51) Int. Cl.
  *B32B 27/08* (2006.01)
  *B32B 29/00* (2006.01)
  *B32B 27/40* (2006.01)
  *B32B 15/20* (2006.01)
  *B65D 85/38* (2006.01)

(56) References Cited

U.S. PATENT DOCUMENTS

| | | | |
|---|---|---|---|
| 3,613,879 | A | 10/1971 | Kemble |
| 3,726,057 | A | 4/1973 | Kemble |
| 3,889,870 | A * | 6/1975 | Bender ............... 383/121 |
| 4,085,244 | A * | 4/1978 | Stillman ............. 383/116 |
| 4,279,344 | A | 7/1981 | Holloway et al. |
| 4,363,345 | A | 12/1982 | Scheibner |
| 4,392,569 | A | 7/1983 | Shoup |
| 4,444,310 | A | 4/1984 | Odell |
| 4,691,820 | A | 9/1987 | Martinez |
| 4,769,261 | A | 9/1988 | Hazelton et al. |
| 4,849,606 | A | 7/1989 | Martens, III et al. |
| 4,998,621 | A | 3/1991 | Meehan |
| 5,009,828 | A | 4/1991 | McCree |
| 5,092,684 | A | 3/1992 | Weeks |
| 5,106,917 | A | 4/1992 | Lee et al. |
| 5,322,161 | A * | 6/1994 | Shichman et al. ........ 206/204 |
| 5,382,094 | A | 1/1995 | Ausnit |
| D356,889 | S | 4/1995 | Abrams et al. |
| D357,115 | S | 4/1995 | Abrams et al. |
| 5,527,112 | A | 6/1996 | Dais et al. |
| 5,598,919 | A * | 2/1997 | Taylor ................... 206/5.1 |
| 5,620,087 | A * | 4/1997 | Martin et al. ............. 206/5.1 |
| 5,620,088 | A | 4/1997 | Martin et al. |
| 5,704,468 | A | 1/1998 | Lust et al. |
| 5,823,327 | A | 10/1998 | Wu et al. |
| 5,853,085 | A | 12/1998 | Luttrell |
| 5,944,189 | A | 8/1999 | Vollenweider et al. |
| 6,029,808 | A | 2/2000 | Peck et al. |
| 6,139,952 | A * | 10/2000 | Furuya et al. ............. 428/339 |
| 6,210,038 | B1 | 4/2001 | Tomic |
| D462,900 | S | 9/2002 | Yamada et al. |
| 6,913,808 | B2 * | 7/2005 | Phillips et al. ............ 428/35.7 |
| 6,929,128 | B2 | 8/2005 | Caldwell et al. |
| 7,422,105 | B2 | 9/2008 | Loyd et al. |
| 7,477,366 | B2 | 1/2009 | Clements et al. |
| 7,828,137 | B2 | 11/2010 | Newman |
| 2004/0146669 | A1 * | 7/2004 | Gollier ............. B29C 65/76 428/35.2 |
| 2004/0172098 | A1 | 9/2004 | Greenberg et al. |
| 2006/0054514 | A1 | 3/2006 | Tokarski et al. |
| 2006/0213783 | A1 | 9/2006 | Tokarski et al. |
| 2008/0017525 | A1 | 1/2008 | Newman |
| 2008/0063325 | A1 | 3/2008 | Miller et al. |

FOREIGN PATENT DOCUMENTS

| | | |
|---|---|---|
| EP | 0648687 | 4/1995 |
| EP | 1092645 A1 | 3/2004 |
| GB | 1337809 | 11/1973 |
| JP | 53110383 U | 9/1978 |
| JP | 56103487 | 8/1981 |
| JP | 59093650 A | 5/1984 |
| JP | 59199458 A | 11/1984 |
| JP | 60139760 U | 9/1985 |
| JP | 6-258603 A | 3/1993 |
| JP | 6-48468 | 2/1994 |
| JP | 6092388 | 4/1994 |
| JP | 2000007020 | 1/2000 |
| JP | 2000502310 | 2/2000 |
| JP | 2003070851 | 3/2003 |

OTHER PUBLICATIONS

Japanese Office Action for corresponding Japanese Patent Application No. 2006-018730, dated Oct. 4, 2011.

* cited by examiner

HEAT SEALABLE, RETORTABLE LAMINATED FOIL

RELATED APPLICATIONS

The present application is a Continuation-in-Part application of U.S. patent application Ser. No. 11/345,219, filed Feb. 2, 2006, now U.S. Pat. No. 8,061,897 entitled "Package," which application claims priority Japanese Patent Application No. 2005- 036281, filed Feb. 14, 2005, now JP Patent No. 4832769 , entitled "Package", which applications are hereby incorporated by reference in their entireties.

FIELD

The present invention relates to a package or a packaging bag material which is opened by separating mated and joined film materials from each other, more particularly, to a laminated film that allows an improved economic form of package for a contact lens which satisfies lens packaging criteria, including sterility and environmentally sensitive disposability.

RELATED ART

Some packages or packaging bags (called "package" hereinafter for the sake of convenience) have a structure in which two materials are mated and sealed at their peripheral edge portions so as to provide a package form having an inner hollow portion into which an inner content is to be filled up, the inner hollow portion being formed as an inner content accommodation compartment. In such package, a known technology provides a structure in which the sealed portion is subjected to an easily separable or peel-off treatment to thereby easily separate the sealed two materials from each other.

One example of such package is disclosed in Japanese Patent Laid-open (KOKAI) Publication No. HEI 6-48468. The package disclosed in this publication is composed of a container having an opening and a lid to tightly seal the opening. A flanged portion is formed to the peripheral edge portion of the opening so as to project outward, and the lid is sealed, at its peripheral edge portion, to the flanged portion. Furthermore, an easily separable treatment is effected to this sealed portion so as to separate or peel off the sealed flanged portion and lid portion with a predetermined peel-off force, thus the lid being separated from the container.

However, when the package formed by mating and sealing the two film materials is made small in size in accordance with a size or amount of a content which fills an accommodation compartment of the package, it is difficult to peel off the sealed portion, and hence, to open the package. That is, when the package becomes small, the opening starting portion (i.e., seal peel-off starting portion) will also become small, so that it is difficult to open such package for a person having a large size hand or with wet fingers.

Soft disposable contact lenses are commonly contained in disposable packages. As packaging adds to the overall cost of the lens, it should be made as economically as possible but without compromise to the requisite packaging criteria. The traditional blister pack packaging for disposable lenses (both bi-weekly and daily) consists of a polypropylene receptacle for the lens (herein after referred to as a "boat"), topped by a multi-layer film consisting of polyethylene, aluminum, a bonding agent and polypropylene. The boat is usually an injection molded plastic which has high stiffness but is capable of limited elastic deflection and includes a preformed recess. The boat is filled with a suitable storage solution, preferably saline, and receives a single lens in situ. The blister pack is then autoclaved using steam and pressure to terminal sterility. These blister packs are presented to the patient in boxes of individual packs or as multiple blister strips.

The marketing objective is to present the contact lens to a patient in an aesthetically pleasing package that both satisfies the statutory requirements for sterility and stability, and allows the patient to remove the lens safely and easily. The packaging is used only once and is discarded after the lens is removed. This impacts the costs of the lens/package combination. In order to reduce the overall price of the lens to the patient, the cost of the packaging should be kept to an absolute minimum. In addition, disposability of lens packages necessitates conformity with ecological standards.

The lens must be kept hydrated while in the package. The package must be well sealed and should minimize water vapor transmission through the boat and laminated layer to maximize the shelf life and prevent drying out of the lens contained therein. In use, the user removes the laminated material from a flange formed on the boat by peeling back the cover to expose the lens immersed in a hydrating solution.

A variety of contact lens packages, particularly disposable contact lens packages including preformed blister packs, are taught in the prior art. As exemplified in the prior art, conventional wisdom in the contact lens industry has been to provide preformed stiff packaging which protects the lens from damage from applied load. Examples of typical prior art blister packs are shown in: U.S. Pat. No. 5,704,468; U.S. Pat. No. 4,392,569; U.S. Pat. No. 5,620,088; U.S. Pat. No. 4,691,820; U.S. Pat. No. 5,823,327; U.S. Pat. No. 5,853,085; EP Patent Publication No.1 092 645 A1. One problem with many blister packs is that the force required to peel off the film layer from the blister has a high peak, followed by a rapid decrease in the amount of force required to open the main part of the seal. This can result in a jerky movement and spilling the contents when the blister is opened. U.S. Patent Application 2004/0172098 has attempted to address this issue by the use of a foil comprising a layer of aluminum laminated with a film comprising a mixture of butane-1 polymer, polypropylene, an inorganic filler and optionally high density polyethylene. In this foil, the inorganic filler switches the foil-blister bond from an adhesive failure to a cohesive failure so as to reduce the force required to open the package, but at the same time being capable of resisting bursting during retorting or autoclaving.

Flexible retort packages are also known, however, not for use with contact lenses. U.S. Pat. No. 4,769,261 discloses a seal layer for use in large institutional sized retort pouches comprising an ABA film structure, wherein the A layers are each composed of a blend of a minor amount of an elastomer and a major amount of a polyolefin and the B layer is composed of a blend of a major amount of an elastomer and a minor amount of polyolefin. Retort pouches made with the ABA film structure as the seal layer exhibit improved impact strength. There is no teaching in the '261 patent to use a retort package for housing a contact lens.

EP Patent Publication No. 0 129 388 describes a sachet formed by sealing together an optically transparent film so as to enclose a contact lens plus hydration solution. This teaching is however directed at maintaining the contact lens in its natural equilibrium shape so as to allow optical measurement to be conducted without opening the pack. In an additional aspect of this teaching, the sachet is provided with a holder or support within the sachet in which the lens is retained to assist in securing the lens to allow such optical measurements as back surface radius of curvature to be made. It is clear therefore that EP '388 is directed at maintaining a contact lens in its equilibrium shape.

Japanese Patent Publication No. 6-258603 similarly describes a resin film pack for the storage of contact lenses. The package is formed from a suitable resin material by sealing three of the four sided together, leaving the fourth side open to insert the contact lens plus storage solution. Once the lens and solution have been placed within the package, the fourth side is then heat sealed. There is no provision within this teaching for the opening of the package. Since the contact lens is placed into the pre-formed package through its open end, there is no provision for favorably orientating the lens for user convenience.

In common with most retortable sachet-style packages, the contact lens packaging described in EP Patent Publication No. 0 129 388 and Japanese Patent Publication No. 6-258603 are designed to be opened by tearing off one end of the sachet, and retrieving the contents through the opened end. The provision of a peelable seal is generally held to be incompatible with a retortable package, since the pressure differentials encountered between the inside of the pack and the outside may lead to failure of the seal. Peelable seals are generally only found in non-retortable sachet packages.

U.S. Pat. No. 4,279,344 however does describe a foil suitable for use in a peelable, retortable sachet packages. The foil is a multilayer laminate comprising a polyethylene terephthalate outer layer adhesion bonded to an aluminum barrier layer, which in turn is bonded to a heat sealable layer comprising polypropylene, or a polyethylene-polypropylene copolymer to which has been blended an ionomer. There is no teaching in the '344 patent to use the retortable, peelable laminate for contact lens applications.

Whilst the teachings within the '344 patent pertain to maintaining sterility of medical devices, there is no direction within the teaching for the maintenance of an aqueous solution for a prolonged periods of storage, such as would be required for the storage of a contact lens over its shelf-life, which is typically 5 years. A defect within the foil structure, such as a pinhole in the aluminum will have the effect of significantly increasing the water vapour permeability of the whole foil. Since a contact lens must be packed with a small quantity of saline, any loss of water vapour from the package will lead to an increase in the salinity of the saline, which will subsequently impact the basic parameters (diameter, base curve, water content etc) of the lens, thus reducing its shelf life. The requirement to maintain a water vapour barrier becomes more acute with contact lens packages of the type described in U.S. Pat. No. 7,828,137, since the volume of saline contained within these packages is typically 0.15 ml.

One method of reducing the probability of pinhole defects within the aluminum foil of the '344 patent would be to use a relatively thick aluminum foil. Typical foils used in prior art contact lens blister applications will have an aluminum thickness of around 70 micron, and such foils are generally selected for use in contact lens applications as they offer a degree of certainty that the aluminum barrier layer will be free of pinhole defects.

Furthermore, any pinholes within the bonding layer will allow the saline solution to contact the aluminum, thus potentially allowing corrosion of the aluminum film to occur. This will be of particular importance for films with a thin (ie <30 micron) thickness of aluminum. Such bonding layer pinholes are commonly found in co-extruded laminates.

SUMMARY

The present invention was made in consideration of the above matters and an object of the present invention is to provide a package formed by mating and sealing film materials and having a seal opening starting structure for easily opening the package.

This and other objects can be achieved according to the present invention by providing a package comprising: a package body formed by mating film materials and sealing peripheral edge portions of the mated film materials so as to form a content accommodation compartment inside the sealed peripheral edge portions, the sealed peripheral edge portions being subjected to an easily peel-off treatment so that the sealed peripheral edge portions are separated and peeled off from each other when the package is opened; a seal opening starting portion formed outside of one of the sealed peripheral edge portions so that the film materials are separated from each other at the seal opening starting portion; and at least one projection provided on at least one of inner and outer side surfaces of the film materials forming the seal opening starting portion.

In preferred embodiments, the projections may be provided on the surfaces of both the mated film materials. The projections may be shifted in positions from each other.

It is desirable that the seal opening starting portion has a thickness substantially equal to a thickness of the content accommodation compartment containing the content.

It may be also desired that independent two sheets of film materials are mated and sealed at the peripheral edge portions of the mated film materials so as to provide the inner content accommodation compartment.

Furthermore, it may be desired that one sheet of film material is folded at a central portion in a longitudinal direction thereof and the folded film materials are mated and sealed to each other at peripheral edge portions other than the folded one edge portion, and the seal opening starting portion is formed on the edge side portion opposing to the folded one edge side portion.

The projection may be provided on the surface of the film material through a fusing process by means of hot air, through a heat-seal treatment, or by means of bonding.

The projection may be composed of a projection member, having a rectangular, circular or like cross section, disposed at the seal opening starting portion. The projection member is composed of a linear projection member extending substantially entirely transversely at a portion at which the seal opening starting portion is formed. The projection may be composed of a curved projection member extending transversely at a portion at which the seal opening starting portion is formed.

According to the present invention including the preferred embodiments, when the package is opened by separating and peeling off the sealed portion formed by sealing the mated film materials, the seal opening starting portion can be easily nipped with fingers. That is, the projection, which is engaged with the fingers for opening the package, is provided to the seal opening starting portion, thus easily opening the sealed portion of the package. In the case where the projection is formed to the inner side surface of the film material, a gap is created between the mated film material, thus also easily nipping the projection and opening the sealed package. Accordingly, such package can be also easily opened by a person having a large hand or fingers and a person having wet hand or fingers.

In addition, since the seal opening operation can be easily performed, the peel-off strength at the sealed portion can be made large to thereby improve the sealing performance greatly. For example, for the conventional package provided with no projection, it was difficult to form the package which was opened with a seal opening force of more than 1500 g/15 mm. On the contrary, for the package of the present invention having the projection, the package which is opened with the seal opening force of 500 to 2000 g/15 mm can be provided.

Furthermore, according to the present invention, the length of the seal opening starting portion can be made short so as to easily open the sealed package. That is, the length of the seal opening starting portion extending from the upper sealed edge portion of the package can be made short, so that the package can be made compact and the film material can be saved in amount, thus being advantageous.

Still furthermore, in the structure in which the height of the projection, i.e., the thickness of the seal opening starting portion is made equal to the thickness of the content accommodation compartment, when such packages are stacked, the packages can be stacked in good balance in height, thus being particularly suitable for the packages being packaged in a box.

The nature and further characteristic features of the present invention will be made more clear from the following descriptions with reference to the accompanying drawings.

BRIEF DESCRIPTION OF THE DRAWINGS

The accompanying drawings illustrate various embodiments of the present system and method and are a part of the specification. The illustrated embodiments are merely examples of the present system and method and do not limit the scope of the claims. The summary and other features and aspects of the present system and method will become further apparent upon reading the following detailed description and upon reference to the drawings in which In the accompanying drawings:

Throughout the drawings, identical reference numbers designate similar, but not necessarily identical, elements.

DETAILED DESCRIPTION

Figure 1:
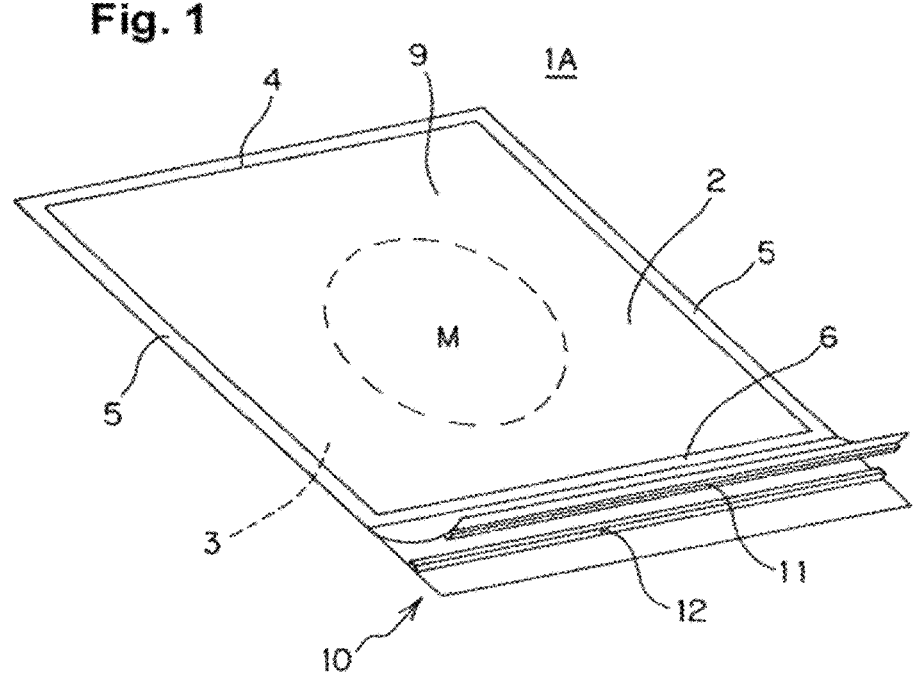
FIG. 1 is a perspective view of a package according to one embodiment of the present invention.

A preferred embodiment of the present invention will be described hereunder with reference to the accompanying drawings. Further, it is to be noted that terms "upper", "lower" and the like terms are used herein with reference to the illustration in the drawings or "upper" corresponds to top side of a package on which an opening is formed and "lower" corresponds to a bottom side of the package.

Figure 2:
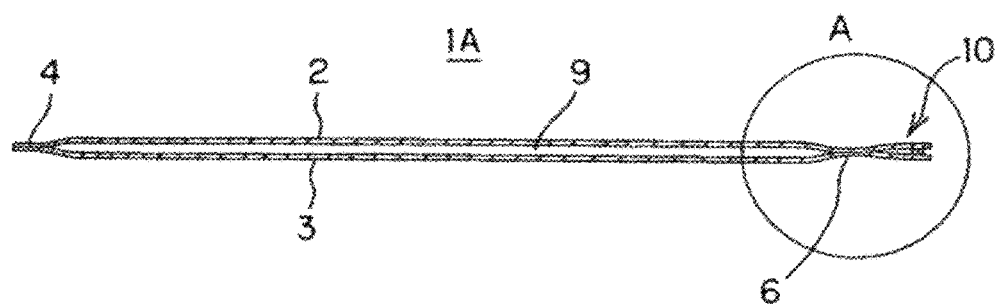
FIG. 2 is a sectional view taken along a longitudinal direction of the package shown in FIG. 1.
Figure 3:
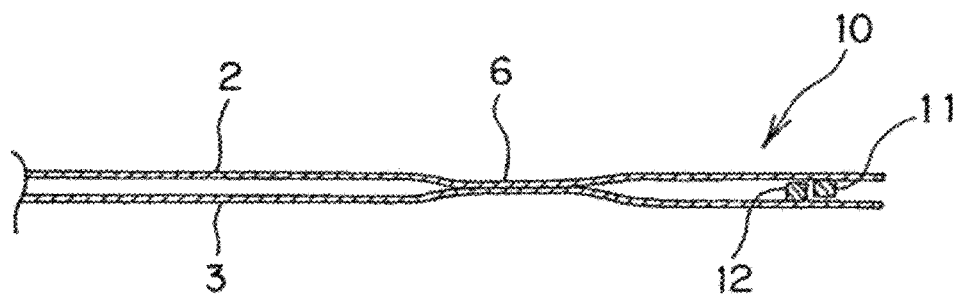
FIG. 3 is a sectional view in an enlarged scale of a portion "A" shown in FIG. 2.

FIGS. 1 to 3 represent a package 1A according to one embodiment of the present invention.

The package 1A is formed by mating, in an overlapping manner, two rectangular sheets of film materials 2 and 3, and the package 1A is provided with sealed portions 4, 5 and 6 which have a constant width at bottom, both sides and top portions of the package 1A. Further, the top side seal portion 6 is formed slightly inside the top end edge portion thereof, and an inner hollow portion surrounded by such seal (or sealed) portions 4, 5 and 6 is formed as an accommodation compartment 9 of an inner content M.

A seal opening starting portion (a portion from which a sealed portion opening operation starts) 10 is formed the upper edge portion forming one side portion of the package 1A. This seal opening starting portion 10 is composed of portions of the film materials 2 and 3 forming the package 1A (i.e., a part of the package 1A) and widened slightly outward from the top seal portion at a slightly inside from the top end edge portion mentioned above.

The package 1A may be utilized for accommodating a small article such as tablet, contact lens or contraceptive, a liquefied fluid such as shampoo or jelly, or a powder such as chemical or condiment.

The package 1A is opened by separating two film materials 2 and 3 from each other from the seal opening starting portion 10 and peeling off the sealed portions 4, 5 and 6, and these sealed portions 4, 5 and 6 are subjected to easily seal-peel-off treatment. As this easily peel-off treatment, there may be adopted various types such as cohesive-peel-off type, lamination-peel-off (delamination) type or boundary-peel-off type, but not limited thereto, as far as the fine sealed state can be ensured of the package 1A in the sealed state, and the sealed film materials 2 and 3 can be easily peeled off when opened.

Figure 4:
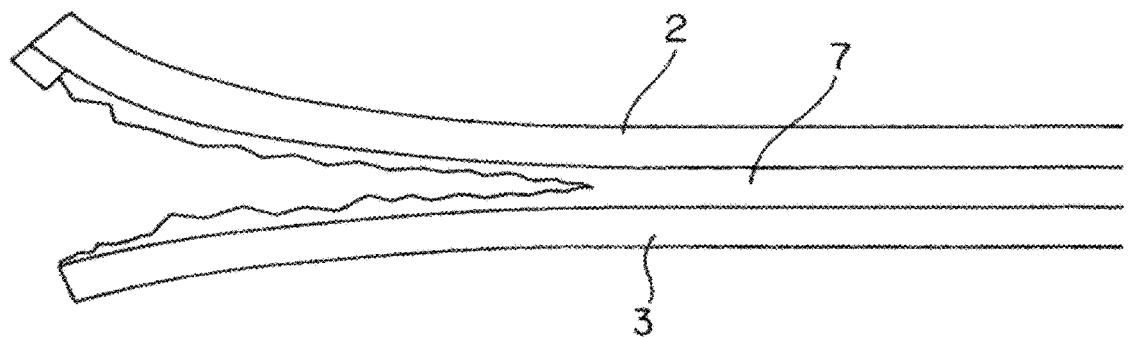
FIG. 4 is a schematic view explaining a cohesive-peel-off type easily peel-off treatment.
Figure 5:
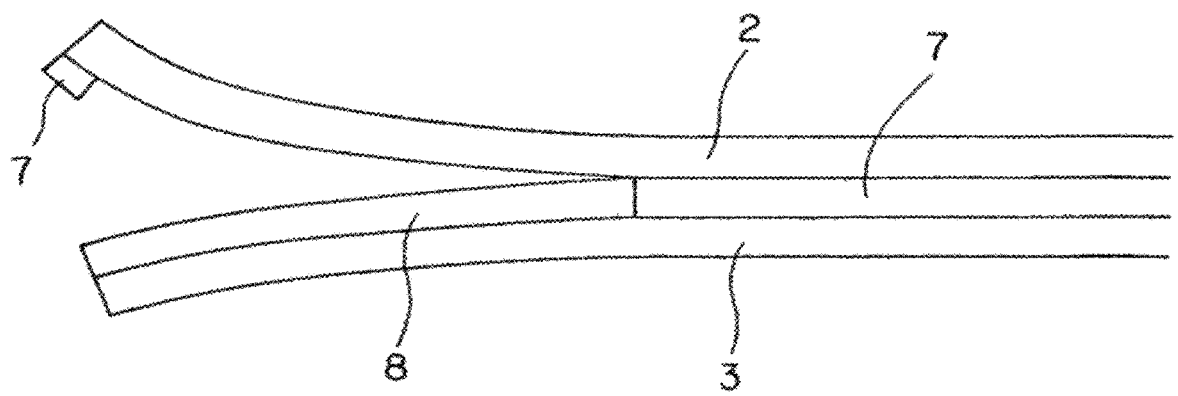
FIG. 5 is a schematic view explaining a delamination (lamination-peel-off) type easily peel-off treatment.
Figure 6:
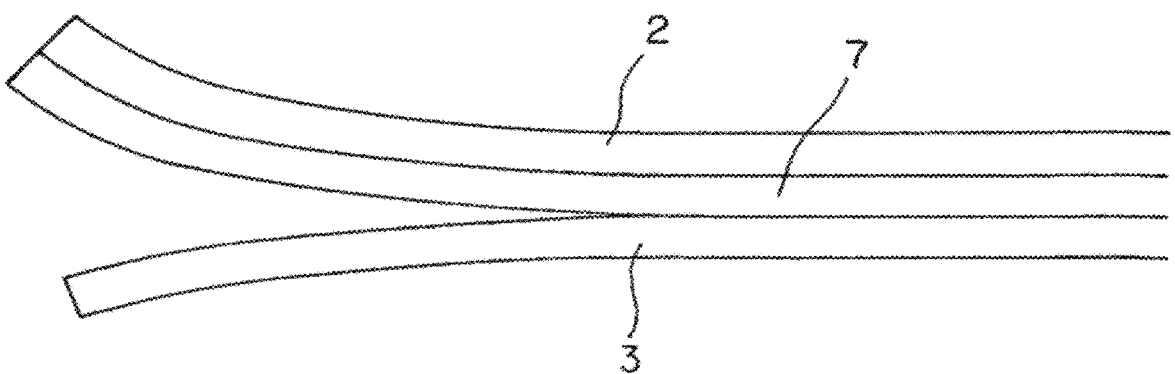
FIG. 6 is a schematic view explaining a boundary-peel-off type easily peel-off treatment.

The cohesive-peel-off type is a type shown in FIG. 4, in which a seal layer 7 is itself broken and separated, and hence, the seal material remains to both the film materials 2 and 3. The lamination-peel-off type is a type shown in FIG. 5, in which a lamination of the film materials 2 and 3 is formed through co-extrusion and a sealing strength between a support layer 8 and the seal layer 7 is made weak so as to separate the support layer and the seal layer 7 from each other at the seal opening starting time. The boundary-peel-off type is a type shown in FIG. 6, in which the seal layer 7 is entirely peeled off together with one film material 2 (3) from the other film material 3 (2), and as such boundary-peel-off type, an easily adhesive resin such as ethylene-vinyl acetate copolymer will be utilized.

As a matter of essential, the following characteristic features will be required for the package 1A. That is, it is required:

1. to be tasteless, odorless and non-poisonous;
2. to have an applicability to machines, and especially, to have a wide applicable range of heat sealing performance (temperature, pressure, time);
3. to have a superior trimming and cutting performance;
4. to have a good seal through contamination (i.e., good seal performance to contamination or impurity) neaeaaSOU-ZATSUBUTSU sealing performance when applied to the package 1A for a fluid including jelly-like materials;
5. to have less dimensional change, and particularly, to have a contraction follow-up property when requiring tensioning;
6. to have a transparency when it is required to confirm the inner content M from the outside of the package 1A;
7. to be designable so as to be adopted individually according to usage with a peel strength in a range of 500 to 2000 g/15 mm;
8. to have a stable peel strength against heat sterilization, change of use condition, and so on and have no change in time elapse;
9. to have a superior strength against the inner content M, and that is, not to provide an orange-peel state due to fat and oil contained in the content M at the time of heat sterilization;
10. to have no knocking and peeling noise at the peeling time and to be smoothly peeled off; and
11. Not to cause any feathering such that stringiness or thin film remains on the peeled surface and to provide a fine peeled surface.

Other than the above matters, it will be necessary to avoid the causing of curling, pitch defective or like due to the lamination of a printed film and to consider seal form, suitability for a sealer, and the like.

With reference to FIGS. 1 to 3, the seal opening starting portion 10 will be further described hereunder.

The seal opening starting portion 10 includes the portions of the film materials 2 and 3 not bonded and separated from each other, and projections or projecting members 11 and 12 are provided on the inner surfaces of the respectively opposing film materials 2 and 3. These projections 11 and 12 provide a gap between the film materials 2 and 3 so as to nip or pinch the film materials with fingers and then separate them from each other. In this embodiment, the projections 11 and 12 are formed as linear projection members each extending in the transverse; i.e., width, direction of the package 1A and having a rectangular shape in section.

These projections 11 and 12 are attached to the inner surfaces of the film materials 2 and 3 with a slight sift so as not to be overlapped with each other in locations. In the illustration of the present embodiment of the package 1A, as shown in FIG. 3, the projection 11 formed to the upper side film material 2 is positioned on the upper edge side (right side as viewed) of the package 1 with respect to the other projection 12 formed to the lower side film material 3. According to such shifting of the projections 11 and 12 in their locations, the gap between the film materials 2 and 3 can be surely formed with the extremely thin thickness of the seal opening starting portion 10 being maintained.

The projections 11 and 12 are attached on the film materials by fusing the projections 11 and 12 on the film materials 2 and 3 by means of hot air or heat-seal process. Furthermore, the projections 11 and 12 may be bonded with a bonding agent, or formed by injecting a resin material on the film materials 2 and 3.

Further, it is to be noted that the above-mentioned projection forming method or process may be applicable for the provision of the projections in other embodiments mentioned hereinafter.

As the film materials 2 and 3 for forming the package 1A, a lamination film of PET (polyethylene terephthalate) 12 μm/Al (aluminum) 20 μm/PET 12 μm/CPP (cast polypropylene) 60 μm is utilized. The CPP 60 μm is a film bonded to each inner surface of the film materials 2 and 3 for easy peel-off treatment.

Figure 20:
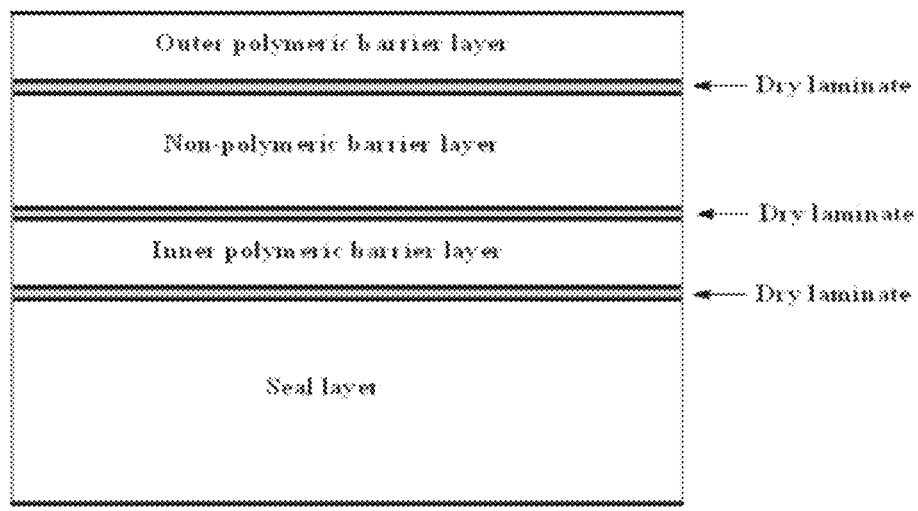
FIG. 20 is a side cross-sectional illustration of a heat sealable laminated foil, according to one exemplary embodiment.

An exemplary film construction is illustrated in FIG. 20 for use with a contact lens and other medical grade packaging. The use of a relatively thick (ie >50 micron) aluminum layer within a contact lens packaging laminate will typically have an impact on the overall esthetic look and feel of the laminate and will result in a package having a metallic feel. For instance, if a prior art contact lens packaging foil is distorted by folding, the foil will show little tendency to recover its undeformed shape, since the overall mechanical properties of the laminate will be dominated by the metallic nature of the aluminum layer (ie the foil will exhibit a plastic deformation). This may often lead to wrinkling of the foil when the blister package is sterilised by autoclaving. This wrinkling is believed to be caused by both pressure differentials experienced by the pack during the heat-up and cool-down phases of the autoclave cycle, and also by differential expansion of the foil and the blister boat to which it is sealed. The effects of differential expansion will be much more pronounced in sachet style packages containing spring members as described in U.S. Pat. No. 7,828,137, which application is incorporated herein by reference, particularly on the bottom foil of the package, that is the foil to which the spring disk is affixed.

By reducing the thickness of the aluminum layer, it is possible to confer a more paper-like feel to the foil laminate, in which all but the most severe distortions will recover elastically, since the mechanical properties of the laminate will be dominated by the polymer films used in its construction. The ability of the foil to recover elastically from all but the most severe distortions will significantly reduce its tendency to wrinkle during autoclave sterilization.

Figure 21:
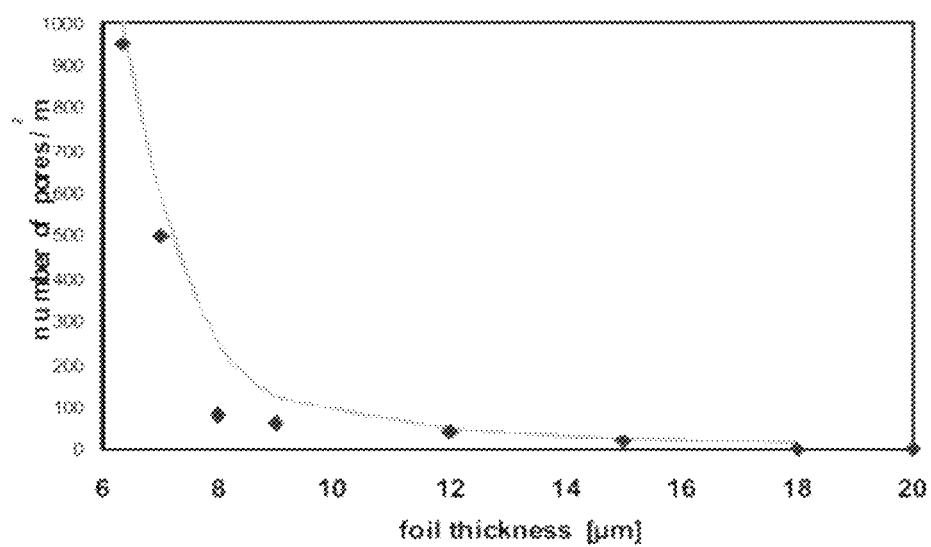
FIG. 21 is a chart showing how the porosity of an aluminum foil will vary with foil thickness.

However, any significant reduction in the thickness of the aluminum foil within the laminate will increase the risk of pinhole defects within the foil which will compromise the water vapour barrier properties of the laminate. FIG. 21 shows how the porosity of aluminum foil will vary with its thickness.

The present foil seeks to overcome these disadvantages with current prior art contact lens packaging laminates by utilizing multiple barrier layers within the laminate so as to allow the use of a thin ≤30 micron) layer of aluminum, with the resulting laminate having a more esthetic look and feel. The present exemplary foils may be formed into peelable sachets which may be sterilised by autoclave. The exemplary foils may also be used with a conventional contact lens blister.

Figure 19:
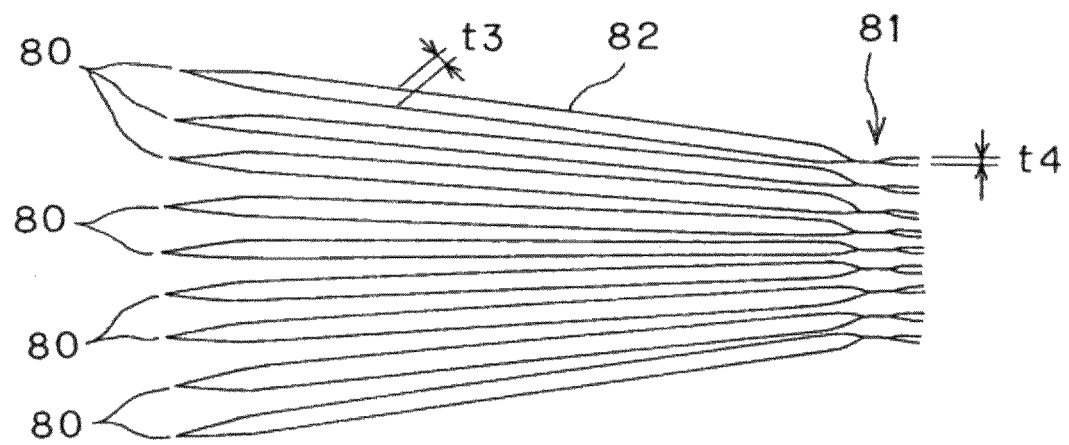
FIG. 19 is an illustration of a plurality of stacked packages provided with no projection members.

FIG. 19 shows the typical configuration of the present exemplary foil. The foil comprises a laminate consisting of an outer polymeric barrier layer, an intermediate barrier layer, an inner polymeric barrier layer and a seal layer. In a most preferred embodiment, the foil is constructed by adhesion lamination, so that these layers are separated by dry laminate layers. In a less preferred embodiment, the foil is produced by extrusion lamination.

The exemplary foil comprises an outer polymeric barrier layer, an intermediate barrier layer, an inner polymeric barrier layer and a seal layer. The foil may be constructed by adhesive lamination, (in which each of the instant layers will be separated by an adhesion layer), or by co-extrusion. The nature and function of each layer of the foil will be described below.

Outer Polymeric Barrier Layer

In one exemplary embodiment, the outer polymeric barrier layer comprises a polymeric film with a maximum water vapour permeability of 100 g/m$^2$0.24 hr. The polymeric film should also have a minimum tensile strength of 150 MPa and a maximum elongation to break of 140%. A highly preferred material is a bi-axially drawn polyester film with a thickness of 12 micron. Suitable materials include those produced by Unitika Ltd of Japan and marketed under the trademark designation of "Emblet Polyester Film". Suitable grades are Emblet PHT 12 or Emblet PET-12. Since it is the outer barrier layer that forms the exterior of the pack, the outer barrier layer may also be optionally printed. In a highly preferred embodiment, the outer barrier layer may be printed on its inner surface, for instance using a 4 color photogravure process, although any suitable printing process known in the art may be employed. If no printing is employed, the visual appearance of the finished laminate will substantially be that of the internal layers of the foil.

The use of a barrier material will also allow for a wider selection of inks for the printing, since the barrier nature of the bi-axially drawn polyester film will protect the ink from the deleterious effects of steam during sterilization. Furthermore, by suitably selecting the grade of polyester film, it is also possible to modify the visual appearance of the final printed foil. For example, if a gloss finish is desired, then Emblet PET-12 may be selected. If a matt finish is required, then Emblet PHT 12 may be selected.

Intermediate Barrier layer

In one exemplary embodiment, the foil will also comprise a non-polymeric intermediate barrier layer. Said non-polymeric intermediate barrier layer may consist of paper, or preferably aluminum and will have a thickness of between 1 micron and 50 micron. In a highly preferred embodiment, the non-polymeric intermediate barrier layer will comprise an aluminum foil with a thickness of 20 micron. Preferably, the aluminum will be produced by slow rolling, and a suitable 20 micron foil is supplied by Showa Denko Packaging Co., Ltd, Japan.

In a second embodiment, the intermediate barrier layer comprises a fluoropolymer film. Suitable examples are polychloro-trifluoroethylene (Aclar) or ethylene-tetrafluoroethylene-copolymer (Halar) film, both of which are supplied by Honeywell Specialty Materials, Morristown, N.J. In these embodiments, the overall laminate will be transparent to visible light.

In another less preferred embodiment, the intermediate barrier layer will comprise a metal such as aluminum or a ceramic (for instance silicon dioxide, or barium oxide) vacuum deposited onto the outward facing surface of the inner polymeric barrier layer. In this embodiment, the intermediate barrier layer will have a thickness of between 5 and 500 Å. When a ceramic barrier layer is used, the resultant laminate may be transparent to visible light.

Inner Polymeric Barrier Layer

The inner polymeric barrier layer comprises a polymeric film with a maximum water vapor permeability of 100 g/m$^2$0.24 hr. The polymeric film should also have a minimum tensile strength of 150 MPa and a maximum elongation to break of 140%. In a preferred embodiment, the inner polymeric barrier layer comprises a bi-axially drawn polyester film with a thickness of 12 micron. Suitable materials include those produced by Unitika Ltd of Japan and marketed under the trademark designation of "Emblet Polyester Film". A suitable material is Emblet PET-12.

Seal Layer

The seal layer comprises of a polymeric material capable of being heat sealed to itself, or to a standard polypropylene contact lens blister package to form a peelable seal. Once sealed, the bond formed between the two sheets of laminate, or between the laminate and standard blister pack will be sufficiently strong to maintain seal integrity during sterilization by autoclave, yet will be capable of being opened by peeling back the laminate. Typically, the force required to peel back the laminate (using a 90° pull) should be below 15N. Ideally, the bond will fail during opening via a cohesive failure of the seal layer, rather than by an adhesive failure of the bond itself.

In a preferred embodiment, the seal layer will comprise a 35 micron thick melt cast polyolefin copolymer film with a minimum melting point of 130° C. Suitable materials are TP6 cast polyolefin copolymer, produced by Okamoto, Japan or Sholex Allomer SA-001, produced by Showa Denko, Japan. Other suitable seal layers are those described in the '344 patent, and those described in U.S. Pat. No. 5,106,917.

In a second embodiment, the seal layer may also contain non toxic antimicrobial agents blended into the polymer. The antimicrobial agents should have a low solubility in water, but be capable of migration within the seal layer, particularly at elevated temperatures. When such a foil is used for a sachet-style contact lens package such as disclosed in U.S. Pat. No. 7,828,137, the front surface of the contact lens will be held in intimate contact with the seal layer of the top laminated foil, and therefore sufficient antimicrobial agent will transfer to the front surface of the lens to mitigate the transfer of microbial species from finger to lens to eye. Examples of some suitable antimicrobial agents are triclosan, furanones, Protectol DA (2,4-dichlorobenzyl alcohol), Amical PC (diiodomethyl-p-sulfone), paraben, etc. Other similar biocides known in the art may also be used. Other functional additives may similarly be blended into seal layer polymer to provide for additional specific functions. Examples may include, but are not limited to, antioxidants, and oxygen scavengers. The seal layer polymer may also contain an inorganic filler such as talc to enhance the peelability of the laminate.

Dry Laminate Layer(s)

In one exemplary embodiment, the exemplary laminate will be produced by adhesion lamination, using a dry laminate process. In this process, an adhesive is evenly spread over one surface of a film, and the coated film is allowed to dry to a tack. The coated film is then adhered to a second film by passing both through a roller. The process is then repeated for subsequent layers. The thickness of the dry laminate layers will preferably be between 1 and 5 microns, and most preferably be between 1 and 3 micron. The lamination adhesives selected may be solvent based or solvent-free.

In the preferred embodiment, the lamination adhesive may comprise a polyester or polyurethane resin (or combination thereof) in a non-toxic organic solvent such as ethyl acetate. Suitable lamination adhesives are TM-250, a polyester-type adhesive produced by Toyo Morton Co., Ltd., Japan, and CAT-RT86 1, a urethane type adhesive also produced by Toyo Morton Co. Ltd. In a most preferred embodiment, a 1:1 mixture of both TM-250 and CAT 86 L is used as the adhesion laminate. The adhesives used should produce a minimum laminate strength of 1.96 N/15 mm, as determined by the method of Japanese standard JIS Z 1707.

In another embodiment, some or all of the layers of the laminate may be formed by co-extrusion. In this event, the dry laminate layers between said co-extruded layers will be absent.

Completed Laminate

The complete laminate will have a total thickness of between 40-150 micron, preferably between 50 and 100 micron. In the most preferred embodiment, the total thickness will be between 75 and 95 micron, and will have a maximum heat seal strength of 20.0N/15 mm, as determined by the method of JIS Z 1707. The water vapor transmission rate, as determined by JIS Z 0208 (at 40° C. and 90% RH) will preferably be below 10 g/m$^2$0.24 hr, or preferably below 1 g/m2.24 hr. In a most preferred embodiment, the water vapor transmission rate will be below 0.05 g/m2.24 hr.

Continuing with the exemplary package, the package 1A formed as mentioned above will be opened in the manner shown in FIGS. 7A to 7C.

Figure 7A:
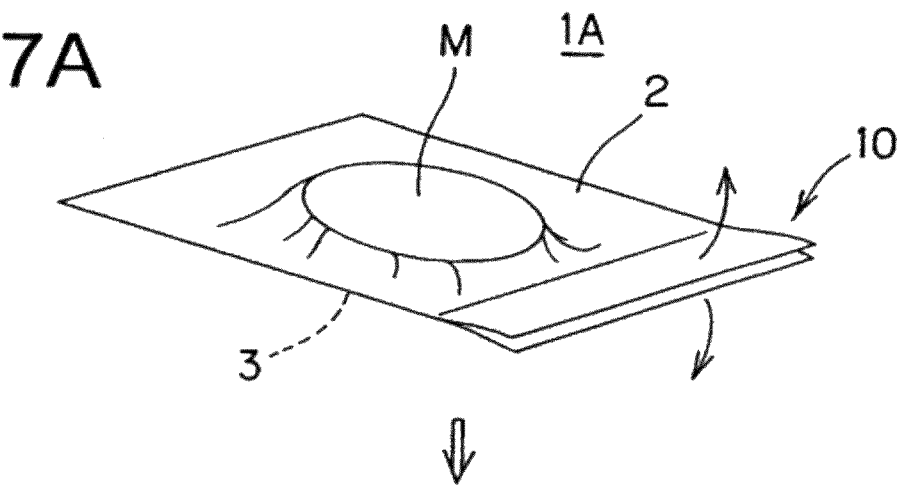
FIGS. 7A to 7C are views for explaining sequences for opening the package.

First, with reference to FIG. 7A, the portions of the film materials 2 and 3 constituting the seal opening starting portion 10 are nipped with fingers, respectively, and then separated from each other. In this time, since the projection members 11 and 12 are formed to the opposed inner surfaces of the respective film materials 2 and 3, the film materials 2 and 3 can be easily nipped with fingers, respectively. When the film materials 2 and 3 are nipped, the projection members 11 and 12 engage with the fingers and then serve as a grip member, thus the film materials 2 and 3 being further easily separated from each other.

Figure 7B:
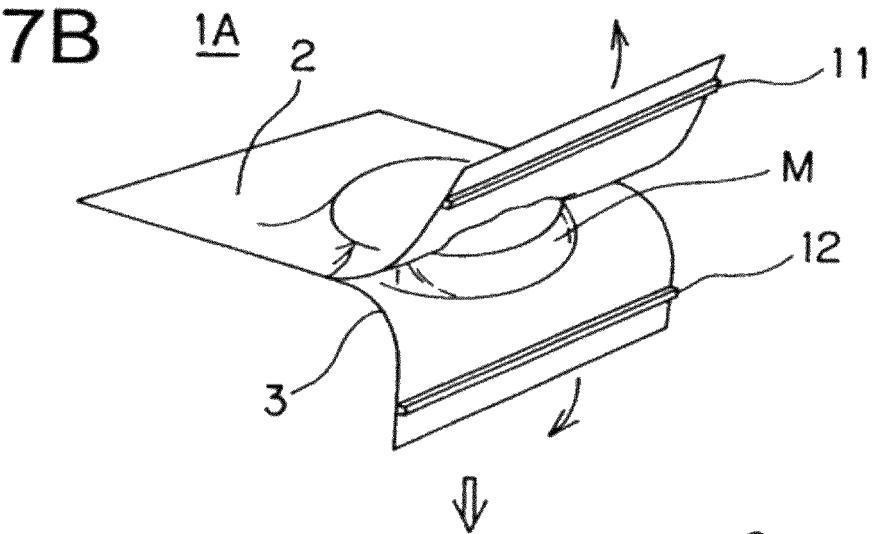
Figure 7C:
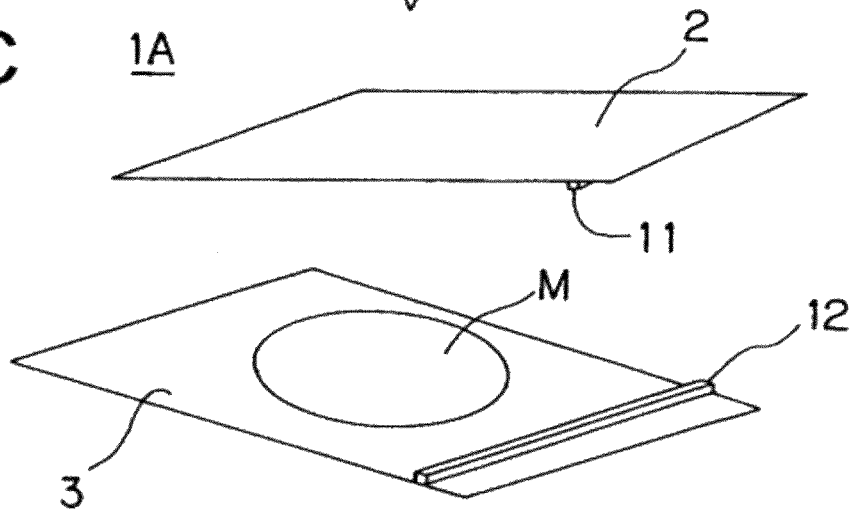

When the separation of the film materials 2 and 3 proceeds as shown in FIG. 7B, the side and top sealed portions 5 and 6 are peeled off and the inner content M is exposed. When the film materials 2 and 3 are further separated, all the sealed portions 4, 5 and 6 are peeled off and separated as shown in FIG. 7C, thus completing the seal opening operation.

The peel-off strength at the sealed portions will be explained hereunder.

For a package provided with no projection or projection members 11 and 12, it will be required for the film materials 2 and 3 to be bonded (sealed) so as to have the peel-off strength of about 500 to 1500 g/15 mm in consideration of the seal opening operation. On the other hand, for the package 1A according to the one preferred embodiment of the present invention, the bag opening operation can be made easy by the provision of the projections 11 and 12, so that the peel-off strength can be increased up to about 2000 g/15 mm, thus providing the package having an increased sealing performance.

In addition, the easy opening of the package allows a length of the film materials 2 and 3 extending outward from the top seal portion 6 constituting a root of the seal opening starting portion 10 to be made short. For this reason, the total longitudinal length of the package 1A can be shortened with the inner volume of the accommodation compartment 9 being maintained, which also serves to save the raw material for the package 1A.

Figure 8:
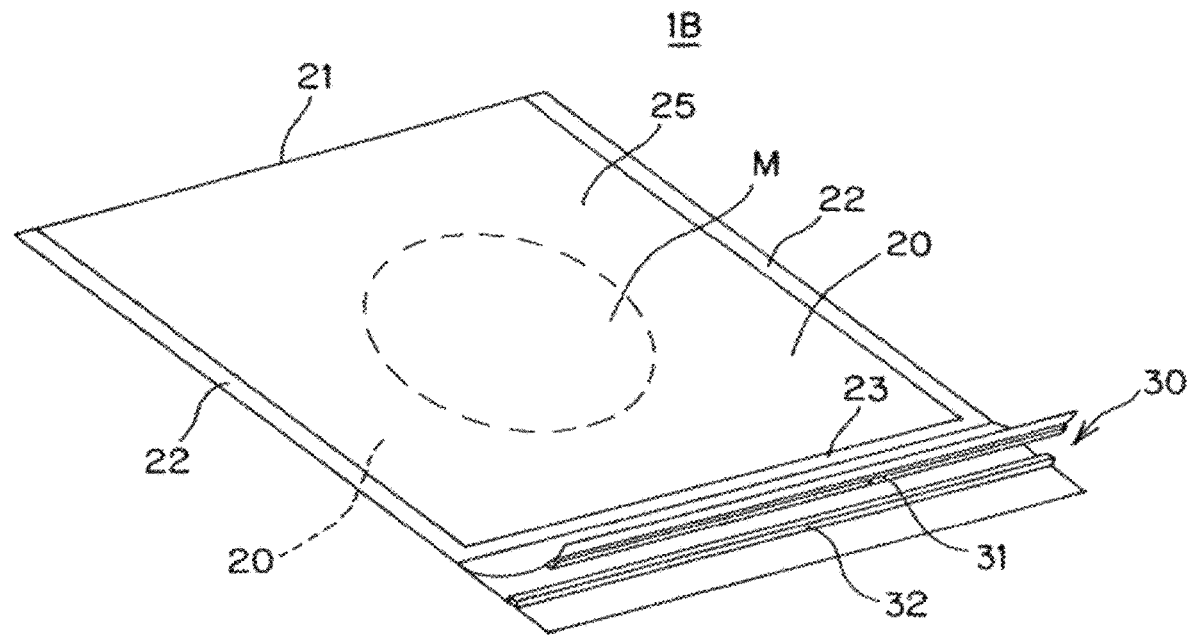
FIG. 8 is a perspective view of a package formed by folding a film material into two sections.
Figure 9:
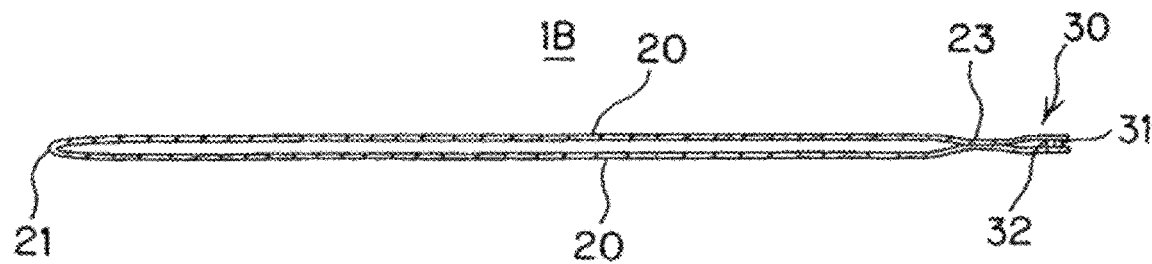
FIG. 9 is a sectional view taken along a longitudinal direction of the package shown in FIG. 8.

In the above embodiment, although two film materials 2 and 3 are overlapped and bonded together, one sheet of film material may be utilized by folding the same into two parts as shown in FIG. 8 or 9 as package 1B.

In this embodiment shown in FIG. 8 or 9, the package 1B is formed by folding, into two portions, one sheet of film material 20 at its central portion. The folded line portion 21 is formed as a bottom portion of the package 1B and an opposing portion is formed as upper portion thereof. The side portions and the upper portion slightly inward from the upper edge of the folded film material 20 are sealed together with a constant width there along as side and top (upper) seal portions 22 and 23, respectively. The inside portion surrounded by these folded bottom portion 21, side seal portions 22 and top seal portion 23 serves as inner content accommodation compartment 25 for accommodating the inner content M.

To the upper edge portion of the package 1B, there is formed a seal opening starting portion 30, which also constitute a portion of the film material 20 extending slightly outward from the top seal portion 23 of the package 1B as mentioned above.

For the seal portions 22 and 23 this package 1B, the easy seal opening treatment are made as mentioned before for the package 1A, and projections or projection members 31 and 32 are provided to the opposing inner surface of the film material 20 at the seal opening starting portion 30.

In the foregoing two embodiments, although the projection has a rectangular cross section, the projection may be formed so as to have another shaped cross section such as circular or like section.

Figure 10:
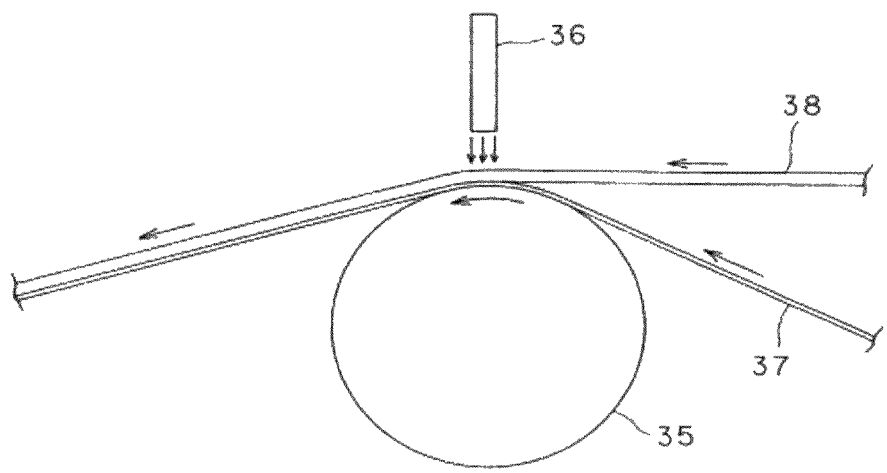
FIG. 10 is a schematic view showing a state of attaching a linear member as projection member.

In such case, the projection may be formed in another manner such as shown in FIG. 10.

FIG. 10 schematically shows a process in which a linear member 38 having a circular cross section is attached to a film material 37 as one example.

In this process, a belt shaped film material 37 is guided in its longitudinal direction by a guide roller 35, and the linear member 38 as projection is guided by the guide roller 35 in the axial direction of the linear member 38. The linear member 38 is positioned on one or each side in the width direction of the film material 37 at the circumferential surface portion of the guide roller 35.

A heater having a nozzle 36 is disposed above the guide roller 35 so that the nozzle 36 is directed to the outer peripheral surface of the guide roller 35. A hot air is ejected through the nozzle 36 of this heater so as to heat the linear member 38 and the film material 37. Thus, the linear member 38 is heated by the ejected hot air during the guidance by the guide roller 35, and the lower surface portion of the linear member contacting the film material 37 is fused to the film material 37 as illustrated in FIG. 11.

When the linear member having the circular cross section is used, in comparison with that having the rectangular cross section, the linear member 38 has a high surface (bearing) pressure at its contacting portion to the film material 37, and in addition, since the circular linear member 38 has a small portion to be contacted to the film material 37, the contacted portion can be easily fused in comparison with the rectangular linear member in the former embodiments, thus being effective and advantageous in the utilization of the linear member having a circular cross section.

In this method, it may be possible to use the film material cut in the size suitable for making one package and the linear member cut in the size suitable therefore, which is fused to the film material through the heating process.

Figure 11:
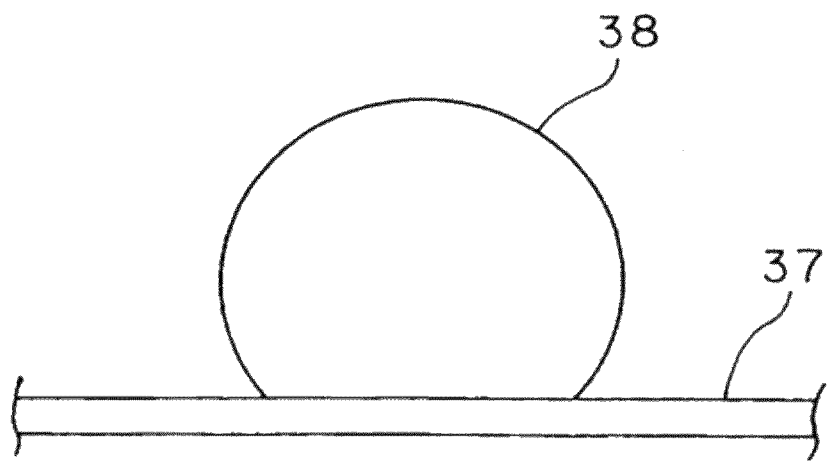
FIG. 11 shows a state that the liner member is attached to the film material.
Figure 15:
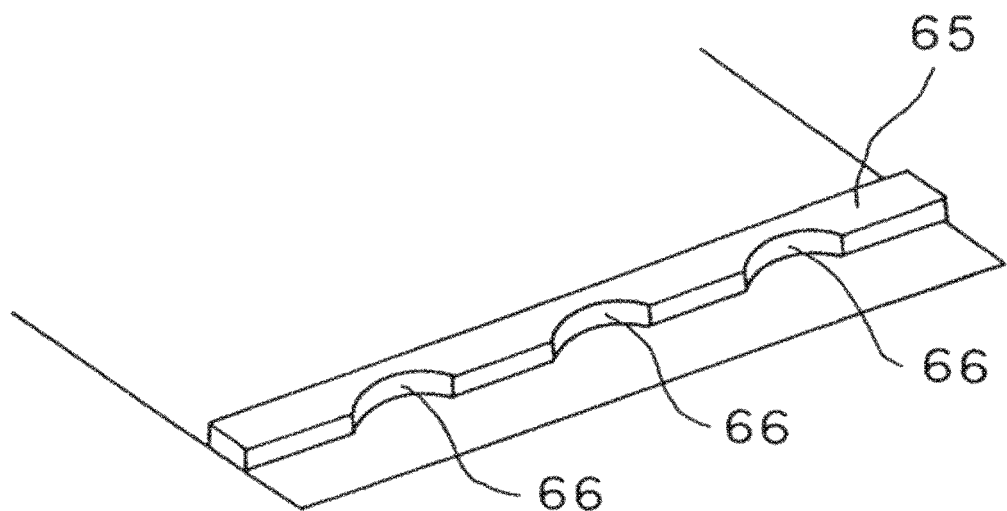
FIG. 15 is a schematic perspective view showing another example of a linear member as projection member formed with notches with which fingers of a person are engaged.
Figure 16:
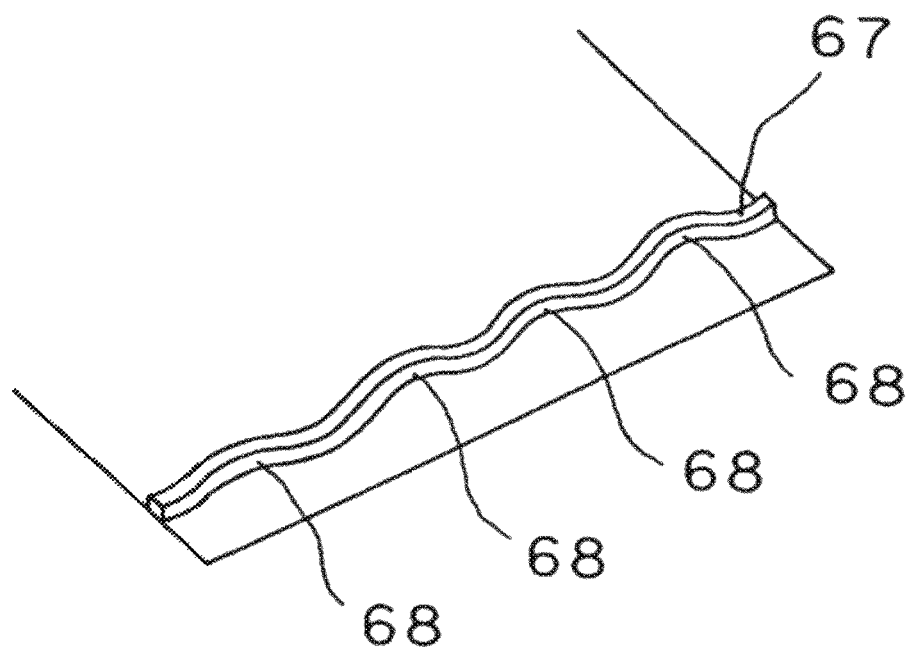
FIG. 16 is a schematic perspective view showing a further example of a projection member in a wave-shape form.

In the example shown in FIGS. 10 and 11, although the sectional shape of the linear member is limited to the circular shape, the present invention is not limited to such circular shape and a semi-circular shape may be adopted as well as rectangular shape. Moreover, a linear or like member having notches or having a wave-shape which are formed at predetermined interval in the axial direction may be adopted such as shown in FIGS. 15 and 16 and described later. Furthermore, the fusing method is not limited to the use of the hot air and a heat-seal method may be also utilized for fusing the linear member to the film material. In a further alternation, the linear member may be bonded by a bonding agent.

In the described embodiments, although there is described the packages have a rectangular outer configuration, the present invention is not limited to such shape and other package having outer configurations other than the rectangular shape may be adopted.

Figure 12:
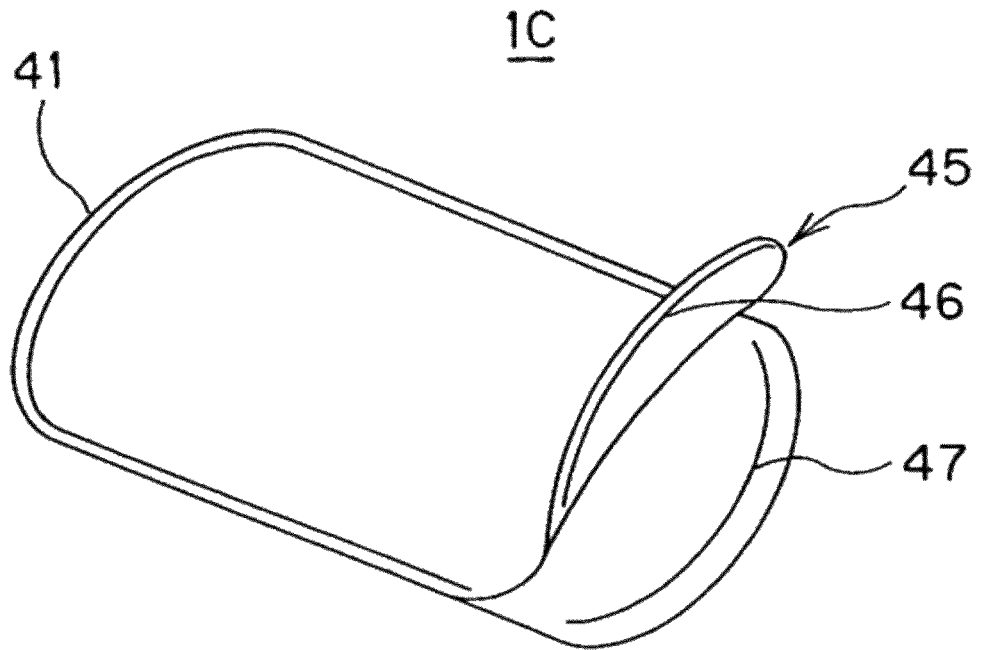
FIG. 12 is a perspective view showing a package having arcuate (circular-arc or round) portions at its top and bottom portions.

For example, as shown in FIG. 12, a package 1C has a bottom portion 41 and an upper (top) edge portion forming a seal opening starting portion 45, both having a round or circular shape. In this embodiment, projections 46 and 47 attached to the inner surfaces of the opposed film materials may be formed so as to provide a curved shape along the upper edge portion of the package 1C as well as linear shape as mentioned before.

Figure 13:
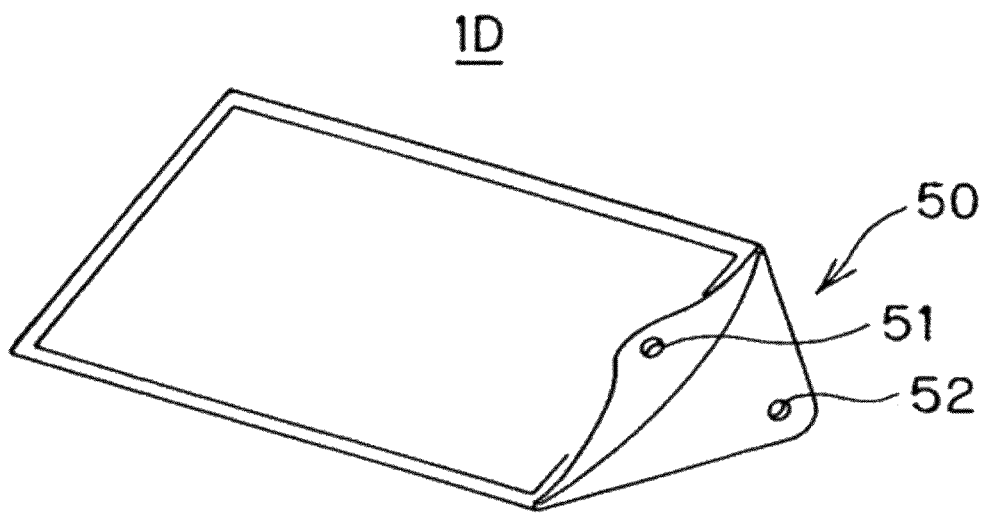
FIG. 13 is a perspective view showing a package having a tapered front end portion from which the package is opened.

Furthermore, FIG. 13 shows a further embodiment of a package 1D having an upper edge portion tapered outward and formed as a seal opening starting portion 50. In this embodiment, point projections or partial projections 51 and 52 may be adopted, except for the linear projections, so as to be suitable for the shape of the seal opening starting portion for the package 1D as shown in FIG. 13 having the tapered seal opening starting portion 50.

Figure 14:
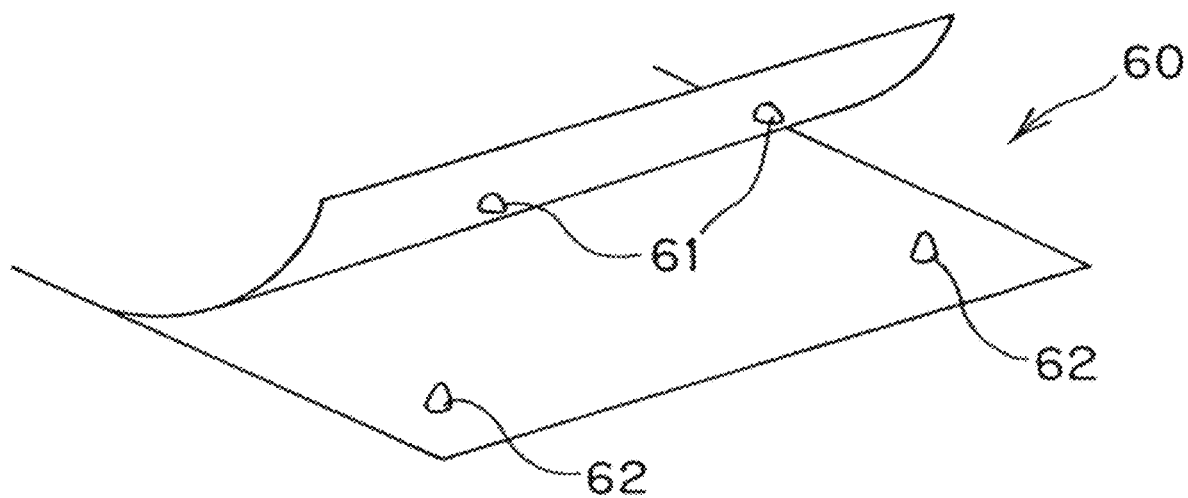
FIG. 14 is a schematic perspective view showing a seal opening starting portion formed with projections different in form from that of the first embodiment of FIG. 1.

FIG. 14 shows a further embodiment of a package according to the present invention, the package having a rectangular shape having a rectangular seal opening starting portion 60. In this embodiment, point or short linear projections 61 and 62 are formed respectively on the inner surfaces of the mated film materials, and the projections 61 and 62 are formed side end portions in the width direction of the package, thus forming the seal opening starting portion 60, with slightly shifted arrangement from each other so as to form a gap between the mated film materials to thereby reduce the thickness of the seal opening starting portion 60.

FIGS. 15 and 16 show further embodiments of a package according to the present invention, in which projections 65 and 67 are formed with circular recesses 66 and 68 with which fingers are engaged for opening the seal of the package. FIG. 15 shows the example of the projections each having circular notches 66, and FIG. 16 shows the example of the projections each having a circular wave-shape 68. According to the formation of such projections 65 and 67 having circular recesses 66 and 68, the fingers of a person can be linearly contacted to the projections to thereby easily nip the projections.

Figure 17:
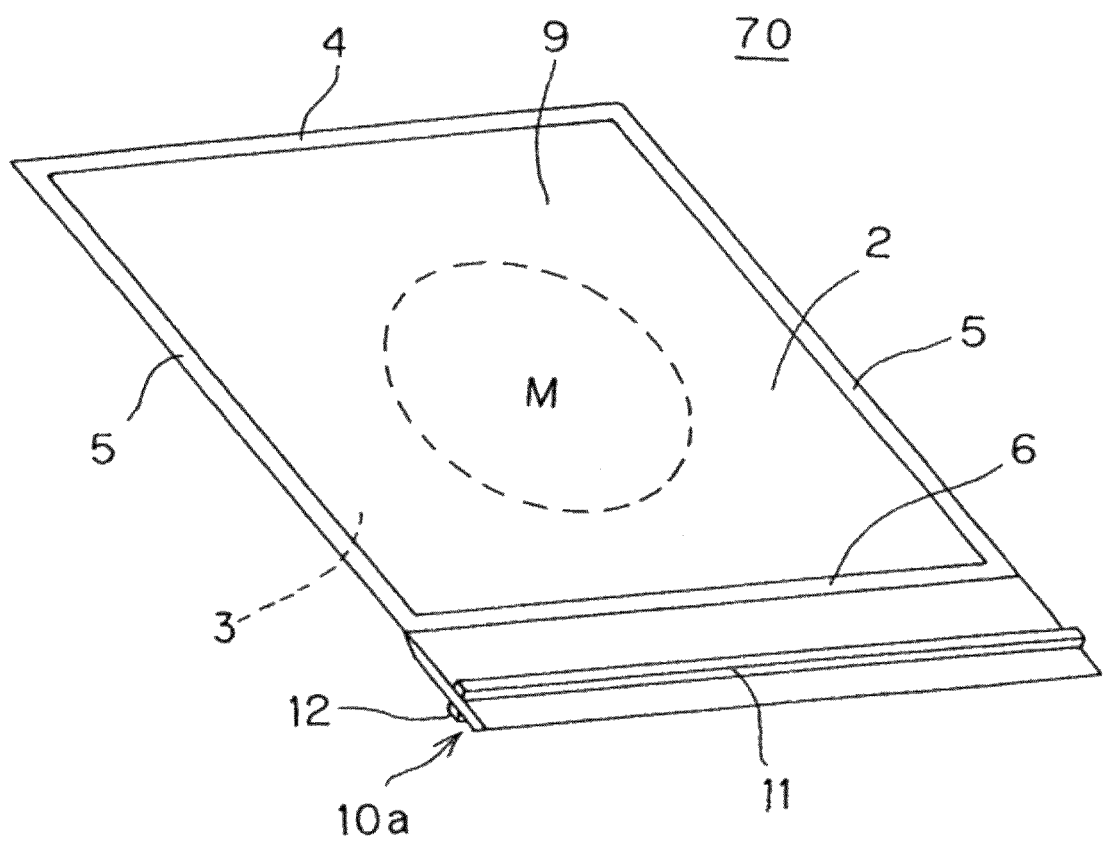
FIG. 17 is a perspective view of a package according to another embodiment of the present invention in which projection members are formed to outer surfaces of a seal opening starting portion of the package.

Still furthermore, FIG. 17 shows a further embodiment of a package according to the present invention, in which projections 11 and 12 are attached to the outer surface sides of portions of the film materials 2 and 3 forming a seal opening starting portion 10a. The package 70 of this embodiment has substantially the same structure as the package 1A and the same portions are added with the same reference numerals and the descriptions thereof are omitted herein. The package 70 of this embodiment differs from the package 1A in the arrangement of the projections 11 and 12 which are formed to the outer surfaces of the film materials 2 and 3.

The packages of all the embodiments of the present invention described above can provide further characteristic features and advantages in addition to those mentioned hereinbefore.

Figure 18:
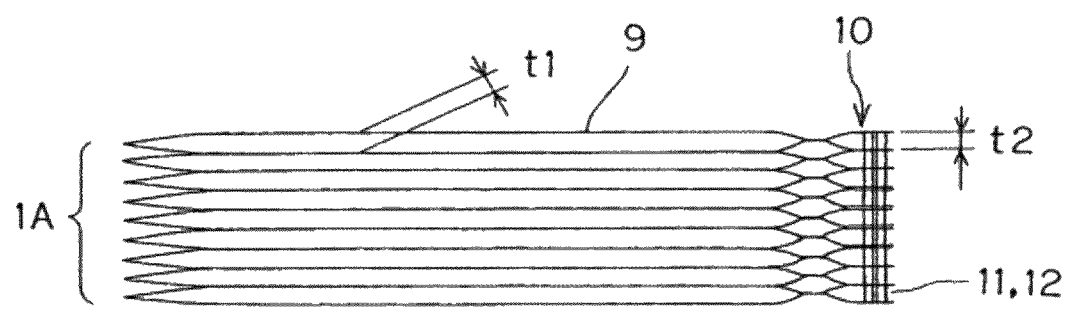
FIG. 18 is an illustration of a plurality of stacked packages of the embodiment shown in FIG. 1.

FIG. 18 is a schematic view showing a plurality of packages 1A in a stacked state. In each of the package 1A, the height of the projection 11 (12) is set such that a thickness t2 of the seal opening starting portion 10 is equal to a thickness t1 of the accommodation compartment 9 in which the content is accommodated. According to such setting of the height of the projection 11 (12), the total thickness of the seal opening starting portions of the stacked packages 1A is substantially equal to that of the stacked content accommodation compartments, thus being advantageous particularly at a time of packaging the packages 1A in a box.

On the other hand, FIG. 19 shows a stacked state of packages 80 each provided with no projection, in which a seal opening starting portion 81 has a small thickness t4 and a content accommodation compartment 82 has a thickness t3 larger than the thickness t4. In this example, a plurality of packages 80 are stacked, bottom portions of the stacked packages 80 will be opened in shape of segment, thus being disadvantageous and troublesome particularly at the time of packaging the packages 80 in a box.

As mentioned above, the formation of the projections contributes to the adjustment of the height at the time of stacking a plurality of packages.

It is further to be noted that the present invention is not limited to the described embodiments, and many other changes and modifications may be made without departing from the scopes of the appended claims.

For example, in an alternation, a projection may be formed or attached onto the surface of only one of the film materials without forming on both the surfaces thereof.

The preceding description has been presented only to illustrate and describe embodiments of the exemplary systems and methods. It is not intended to be exhaustive or to limit the systems and methods to any precise form disclosed. Many modifications and variations are possible in light of the above teaching.

What is claimed is:

1. A heat sealable, autoclavable laminated foil configured to be heat sealed to itself or to a polypropylene substrate, wherein the foil comprises:
   i. an outer polymeric vapor barrier layer wherein the polymeric layer is a bi-axially drawn polyester film with a thickness of approximately 12 microns;
   ii. an intermediate vapor barrier layer formed of slow rolled aluminum having a thickness of less than 30 microns;
   iii. an inner polymeric vapor barrier layer wherein the inner polymeric vapor barrier layer is a bi-axially drawn polyester film with a thickness of approximately 12 microns; and iv. a heat sealable layer wherein the heat sealable layer is a melt cast polyolefin copolymer film with a minimum melting point of 130 degrees Celsius;

wherein a seal strength of said foil when heat sealed to itself is less than 20N/15mm after autoclaving.

2. The laminated foil of claim 1 wherein the maximum water vapor transmission rate of said foil is 10 g/m2 per 24 hr at 40° C. and 90% relative humidity.

3. The laminated foil of claim 2 wherein the heat sealable layer further comprises an inorganic filler.

4. The laminated foil of claim 2, wherein the inorganic filler comprises talc.

5. The laminated foil of claim 1 wherein each layer is separated by a dry laminate layer.

6. A sealed primary contact lens package configured for storing a contact lens for a period in time in excess of two years, the package comprising:

a bottom layer;

a top layer sealed to said bottom layer, said top layer and said bottom layer being sealed together to define a storage space; and a contact lens and hydrating solution disposed in said storage space;

wherein said top layer is a heat sealable, retortable laminated foil configured to be heat sealed to itself or to a polypropylene substrate, wherein the foil comprises:

i. an outer polymeric vapor barrier layer wherein the outer polymeric vapor barrier layer is a bi-axially drawn polyester film with a thickness of approximately 12 micron;

ii. an intermediate vapor barrier layer formed of slow rolled aluminum having a thickness of less than 30 micron;

iii. an inner polymeric vapor barrier layer wherein the inner polymeric vapor barrier layer is a bi-axially drawn polyester film with a thickness of approximately 12 micron; and iv. a heat sealable layer wherein the heat sealable layer is a melt cast polyolefin copolymer film with a minimum melting point of 130° Celsius;

wherein heat sealing the foil to itself or a polypropylene substrate provides a peelable seal, with a heat seal strength less than 20N/15 mm.

7. The contact lens package of claim 6, wherein the water vapor transmission rate of said laminated foil is less than 10 g/m2 per 24 hr at 40° C. and 90% relative humidity.

8. The contact lens package of claim 7 wherein the heat sealable layer of said laminated foil further comprises an inorganic filler.

9. The contact lens package of claim 8, wherein inorganic filler comprises talc.

10. The contact lens package of claim 6, wherein said top layer and said bottom layer are each formed of a heat sealable, autoclavable laminated foil configured to be heat sealed to itself or to a polypropylene substrate, wherein the foil comprises:

i. an outer polymeric vapor barrier layer, wherein the outer polymeric vapor barrier layer is a bi-axially drawn polyester film with a thickness of approximately 12 micron;

ii. an intermediate vapor barrier layer formed of slow rolled aluminum having a thickness of less than 30 micron;

iii. an inner polymeric vapor barrier layer, wherein the inner polymeric vapor barrier layer is a bi-axially drawn polyester film with a thickness of approximately 12 micron; and iv. a heat sealable layer;

wherein said contact lens package is configured to be sterilized using autoclave sterilization.

\* \* \* \* \*